United States Patent
Yang et al.

(10) Patent No.: US 8,149,536 B1
(45) Date of Patent: Apr. 3, 2012

(54) PERPENDICULAR MAGNETIC RECORDING HEAD HAVING A POLE TIP FORMED WITH A CMP UNIFORMITY STRUCTURE

(75) Inventors: Danning Yang, Fremont, CA (US); Yingjian Chen, Fremont, CA (US); Brant Nease, Fremont, CA (US); Kyusik Sin, Gyeonggi-Do (KR)

(73) Assignee: Western Digital (Fremont), LLC, Fremont, CA (US)

( * ) Notice: Subject to any disclaimer, the term of this patent is extended or adjusted under 35 U.S.C. 154(b) by 834 days.

(21) Appl. No.: 11/871,672

(22) Filed: Oct. 12, 2007

Related U.S. Application Data (62) Division of application No. 10/936,921, filed on Sep. 8, 2004, now Pat. No. 7,296,339.

(51) Int. Cl.
*G11B 5/127* (2006.01)

(52) U.S. Cl. .............. 360/125.03; 360/125.14

(58) Field of Classification Search ............ 360/125.02, 360/125.03, 125.13, 125.14, 125.15
See application file for complete search history.

(56) References Cited

U.S. PATENT DOCUMENTS

| | | | |
|---|---|---|---|
| 4,274,022 A | 6/1981 | Elsel | |
| 4,404,609 A | 9/1983 | Jones, Jr. | |
| 4,546,398 A | 10/1985 | Toda et al. | |
| 4,636,897 A | 1/1987 | Nakamura et al. | |
| 4,646,429 A | 3/1987 | Mori | |
| 4,779,463 A | 10/1988 | Woodruff | |
| 4,855,854 A | 8/1989 | Wada et al. | |
| 4,943,882 A | 7/1990 | Wada et al. | |
| 5,027,247 A | 6/1991 | Nakanishi | |
| 5,181,151 A | 1/1993 | Yamashita et al. | |
| 5,225,953 A | 7/1993 | Wada et al. | |
| 5,393,233 A | 2/1995 | Hong et al. | |
| 5,578,857 A | 11/1996 | Hong et al. | |
| 6,261,918 B1 | 7/2001 | So | |
| 6,292,329 B1 | 9/2001 | Sato et al. | |
| 6,315,839 B1 | 11/2001 | Pinarbasi et al. | |
| 6,353,995 B1 | 3/2002 | Sasaki et al. | |
| 6,433,970 B1 | 8/2002 | Knapp et al. | |
| 6,475,062 B1 | 11/2002 | Kubota et al. | |
| 6,501,619 B1 | 12/2002 | Sherrer et al. | |
| 6,504,675 B1 | 1/2003 | Murdock et al. | |
| 6,513,228 B1 | 2/2003 | Khizroev et al. | |
| 6,522,007 B2 | 2/2003 | Kouno et al. | |
| 6,587,314 B1 | 7/2003 | Lille | |
| 6,709,322 B2 | 3/2004 | Saldana et al. | |
| 6,740,471 B1 | 5/2004 | Lu et al. | |
| 6,743,642 B2 | 6/2004 | Costrini et al. | |
| 6,751,054 B2 | 6/2004 | Sato et al. | |
| 6,757,141 B2 | 6/2004 | Santini et al. | |
| 6,784,548 B2 | 8/2004 | Kouno et al. | |
| 6,795,277 B2 * | 9/2004 | Tsuchiya et al. | 360/317 |
| 6,807,027 B2 | 10/2004 | McGeehin et al. | |
| 6,808,442 B1 | 10/2004 | Wei et al. | |
| 6,809,899 B1 * | 10/2004 | Chen et al. | 360/125.13 |
| 6,833,979 B1 | 12/2004 | Knapp et al. | |

(Continued)

*Primary Examiner* — Brian Miller (57) ABSTRACT

A method and system for manufacturing a perpendicular magnetic recording head is disclosed. The method and system include providing a chemical mechanical planarization (CMP) uniformity structure having an aperture therein and forming a perpendicular magnetic recording pole within the aperture. The CMP uniformity structure may include a CMP barrier layer. The method and system further include fabricating an insulator after formation of the perpendicular magnetic recording pole and performing a CMP to remove a portion of the insulator, expose a portion of the perpendicular magnetic recording pole and planarize an exposed surface of the perpendicular magnetic recording head.

9 Claims, 6 Drawing Sheets

U.S. PATENT DOCUMENTS

| | | | |
|---|---|---|---|
| 6,836,957 B2 | 1/2005 | Kobayashi | |
| 6,843,707 B2 | 1/2005 | Saldana et al. | |
| 6,876,518 B2 | 4/2005 | Khizroev et al. | |
| 6,876,519 B1 | 4/2005 | Litvinov et al. | |
| 6,952,867 B2 | 10/2005 | Sato | |
| 6,960,281 B2* | 11/2005 | Han et al. | 204/192.34 |
| 7,024,756 B2* | 4/2006 | Le et al. | 29/603.12 |
| 7,206,166 B2 | 4/2007 | Notsuke et al. | |
| 7,227,720 B2* | 6/2007 | Sasaki et al. | 360/125.12 |
| 7,296,339 B1 | 11/2007 | Yang et al. | |
| 7,508,627 B1* | 3/2009 | Zhang et al. | 360/125.12 |
| 7,518,824 B2* | 4/2009 | Sasaki et al. | 360/125.09 |
| 7,552,523 B1* | 6/2009 | He et al. | 29/603.16 |
| 7,911,735 B1* | 3/2011 | Sin et al. | 360/119.02 |
| 2001/0008501 A1 | 7/2001 | Sekine | |
| 2001/0035357 A1* | 11/2001 | Sasaki | 205/922 |
| 2002/0006013 A1 | 1/2002 | Sato et al. | |
| 2002/0012195 A1* | 1/2002 | Lahiri et al. | 360/97.01 |
| 2002/0012196 A1 | 1/2002 | Obara | |
| 2002/0151254 A1 | 10/2002 | Saldana et al. | |
| 2002/0190382 A1 | 12/2002 | Kouno et al. | |
| 2002/0191336 A1 | 12/2002 | Hsiao et al. | |
| 2003/0039064 A1 | 2/2003 | Khizroev et al. | |
| 2003/0071263 A1 | 4/2003 | Kouno et al. | |
| 2003/0117749 A1 | 6/2003 | Shukh et al. | |
| 2004/0001283 A1 | 1/2004 | Fontana et al. | |
| 2004/0008446 A1 | 1/2004 | Schmidt | |
| 2004/0008451 A1 | 1/2004 | Zou et al. | |
| 2004/0032692 A1* | 2/2004 | Kobayashi | 360/126 |
| 2004/0075927 A1* | 4/2004 | Gill | 360/55 |
| 2004/0102138 A1 | 5/2004 | Saldana et al. | |
| 2004/0150912 A1 | 8/2004 | Kawato et al. | |
| 2004/0161576 A1 | 8/2004 | Yoshimura | |
| 2004/0252415 A1 | 12/2004 | Shukh et al. | |
| 2004/0257711 A1* | 12/2004 | Ushiyama et al. | 360/317 |
| 2005/0011064 A1 | 1/2005 | Lee | |
| 2005/0024779 A1* | 2/2005 | Le et al. | 360/317 |
| 2005/0068671 A1 | 3/2005 | Hsu et al. | |
| 2006/0044681 A1 | 3/2006 | Le et al. | |
| 2006/0109588 A1* | 5/2006 | Le et al. | 360/126 |
| 2006/0139802 A1* | 6/2006 | Sasaki et al. | 360/126 |
| 2006/0168603 A1 | 7/2006 | Goto | |
| 2008/0148301 A1 | 6/2008 | Masaoka et al. | |
| 2008/0184278 A1 | 7/2008 | Leigh et al. | |
| 2008/0278861 A1* | 11/2008 | Jiang et al. | 360/319 |
| 2008/0297945 A1* | 12/2008 | Han et al. | 360/125.3 |
| 2010/0078406 A1* | 4/2010 | Guthrie et al. | 216/22 |
| 2010/0112486 A1* | 5/2010 | Zhang et al. | 430/314 |

* cited by examiner

PERPENDICULAR MAGNETIC RECORDING HEAD HAVING A POLE TIP FORMED WITH A CMP UNIFORMITY STRUCTURE

CROSS-REFERENCE TO RELATED APPLICATIONS

This application is a divisional of U.S. patent application Ser. No. 10/936,921, filed Sep. 8, 2004, herein incorporated by reference in its entirety.

FIELD OF THE INVENTION

The present invention relates to magnetic recording technology, and more particularly to a method and system for fabricating a perpendicular recording head.

BACKGROUND OF THE INVENTION

Figure 1:
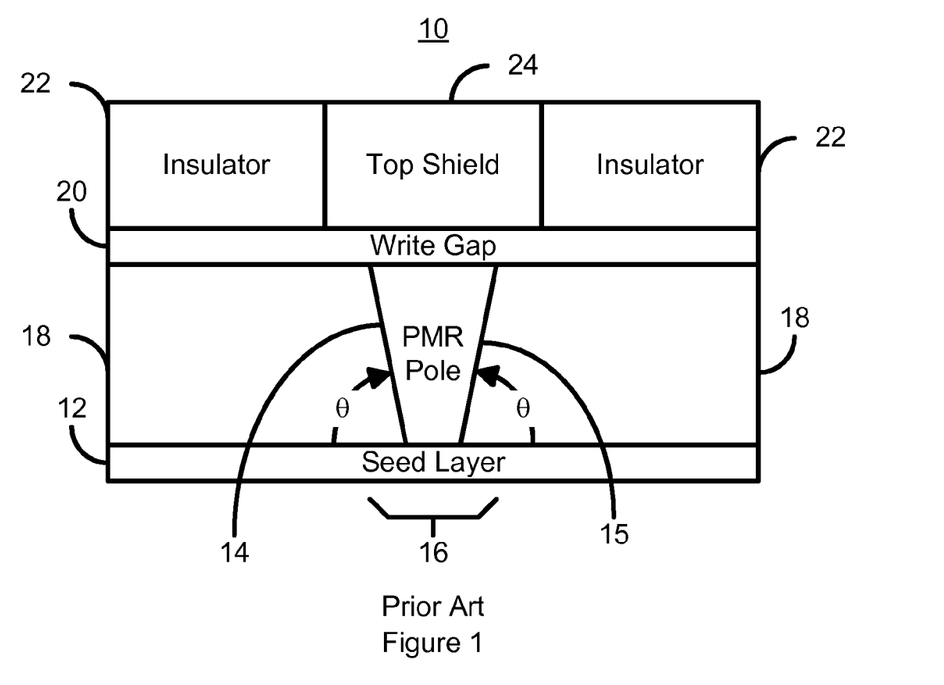
FIG. 1 is diagram depicting a conventional perpendicular magnetic recording pole.

FIG. 1 depicts a portion of conventional perpendicular magnetic recording (PMR) head 10 as viewed from the air-bearing surface (ABS). The conventional PMR head 10 includes a conventional pole 16 and a top shield 24 separated by a write gap 20. Note that the top shield 24 also acts as pole during writing using the conventional PMR head 10. The conventional pole 16 and the top shield 24 are surrounded by insulating layers 18 and 22. The conventional pole 16 resides on a seed layer 12 and has sidewalls 14.

In conventional applications, the height of the conventional pole 16 is typically less than approximately three-tenths micrometer. The conventional pole 16 also has a negative angle such that the top of the conventional pole 16 is wider than the bottom of the conventional pole 16. Stated differently, the angle θ of the sidewalls is less than 90 degrees in the conventional pole 16 of FIG. 1. A pole having this height and shape is desirable for use in PMR applications.

Figure 2:
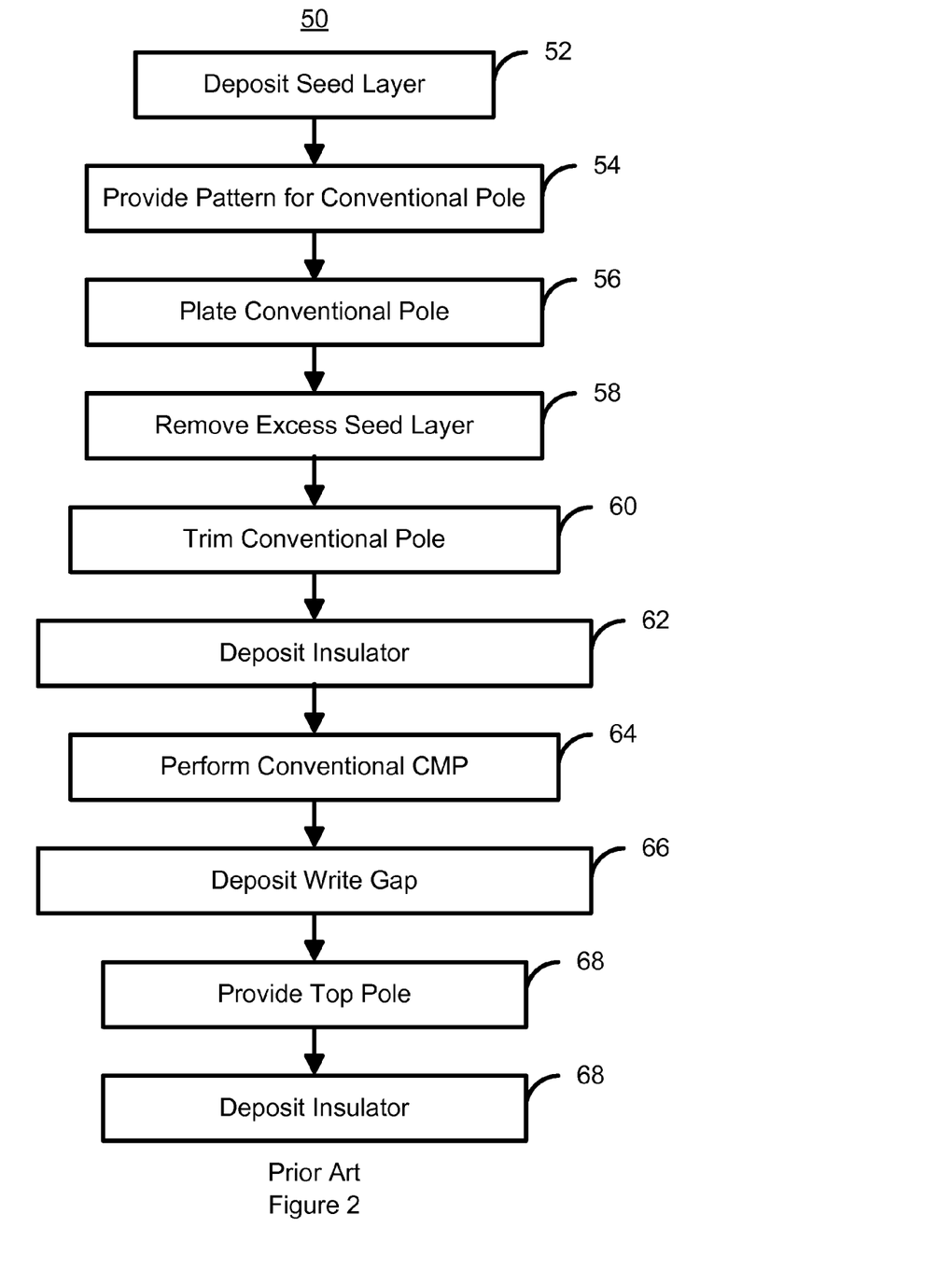
FIG. 2 is a flow chart depicting a conventional method for fabricating a perpendicular magnetic recording pole.

FIG. 2 depicts a conventional method 50 for forming the conventional PMR head 10. A seed layer 12 for the conventional pole 16 is deposited and the pattern for the conventional pole 16 formed, via steps 52 and 54, respectively. The material for the conventional pole 16 is plated, via step 56. The remaining seed layer around the conventional pole 16 is removed, via step 58. The conventional pole 16 is then trimmed, via step 60. Consequently, the width of the conventional pole 16 and the negative angle are set in step 60. The insulator 18 is deposited around the conventional pole 16, via step 62. A chemical mechanical planarization (CMP) is performed to planarize the surface and expose the conventional pole 16, via step 64. The surface is planarized in order to allow subsequent processing to be performed as desired. The write gap 20 is provided, via step 66. The top shield 24 that also acts as the pole is deposited and patterned in step 68. Finally, the region around the top shield 24 is insulated, via step 70.

Although the conventional method 50 can be used to form a conventional PMR head 10, the variation in the CMP process used in exposing the conventional pole 16 in step 64 has a relatively large vertical variation. In particular, the three-sigma variation in the CMP is on the order of three-tenths micrometer. The variation in the CMP process is thus on the order of the height of the conventional pole 16. As a result, the height of the conventional pole 16 may be extremely difficult to control and fabrication of suitable conventional PMR heads 10 difficult to repeat. Manufacturing of conventional PMR heads 10 may, therefore, have a very low yield.

Accordingly, what is needed is an improved, repeatable method for fabricating a PMR head. The present invention addresses such a need.

BRIEF SUMMARY OF THE INVENTION

The present invention provides a method and system for manufacturing a perpendicular magnetic recording head. The method and system comprise providing a CMP uniformity structure having an aperture therein and forming a perpendicular magnetic recording pole within the aperture. The method and system further include fabricating an insulator after formation of the perpendicular magnetic recording pole and performing a CMP to remove a portion of the insulator, expose a portion of the perpendicular magnetic recording pole and planarize an exposed surface of the perpendicular magnetic recording head.

According to the method and system disclosed herein, the present invention allows perpendicular recording poles to be repeatably fabricated using CMP in processing.

DETAILED DESCRIPTION OF THE INVENTION

Figure 3A:
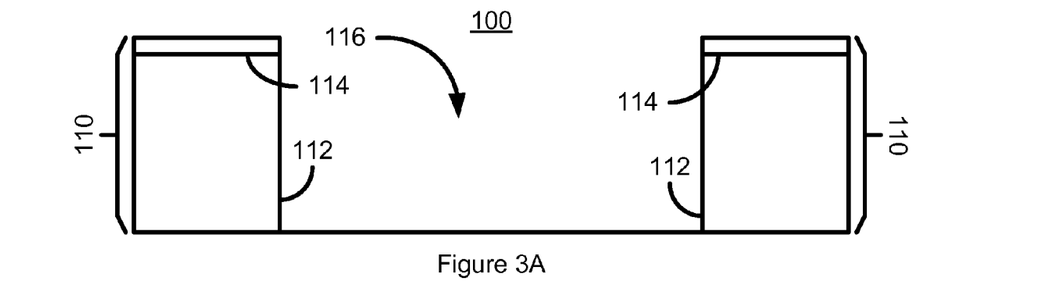
FIGS. 3A-3E depict a perpendicular magnetic recording head formed in accordance with an exemplary embodiment of the present invention.

FIGS. 3A-3E depict one embodiment of a PMR head 100 formed during fabrication in accordance with an exemplary embodiment of the present invention during fabrication. To enhance clarity FIGS. 3A-3E are not drawn to scale. FIG. 3A depicts a preferred embodiment of the CMP uniformity structure 110 used in forming a PMR (not shown in FIG. 3A) pole for the PMR head 100. The CMP uniformity structure 110 includes an aperture 116 therein. The PMR pole for the PMR head 100 is formed in the aperture 116. The CMP uniformity structure 110 used to reduce the variations in the CMP process, as described below. To form the CMP uniformity structure 110, its layer of the CMP uniformity structure 110 are deposited and patterned, generally using photolithography.

In a preferred embodiment, depicted in FIG. 3A, the CMP uniformity structure 110 includes a CMP support structure 112 and a CMP barrier layer 114. The CMP support structure 112 is insulating and, in a preferred embodiment, includes material(s) such as $Al_2O_3$, $SiO_2$, SiN, and/or diamond-like carbon. In a preferred embodiment, the CMP support structure 112 has a thickness that is at least the desired final thickness of the PMR pole being formed. In one embodiment, the CMP support structure 112 has a thickness of 0.1-0.4 μm. The CMP barrier layer 114 includes at least one of Ta, Ti, TiN, TaN, diamond-like carbon. Also in a preferred embodiment, CMP barrier layer 114 is configured to have a removal rate of at least approximately five to ten times slower than the removal rate of an insulator used to insulate the pole during a CMP designed to remove the insulator.

Figure 3B:
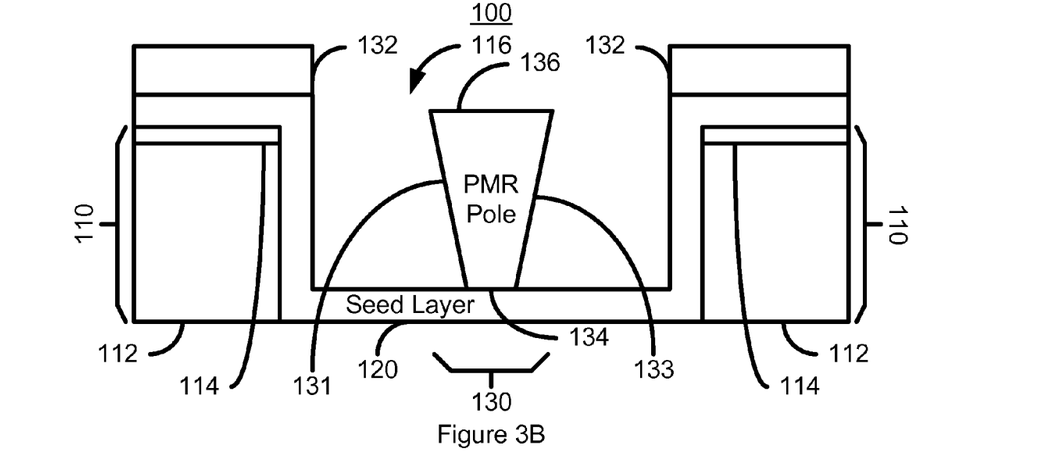

FIG. 3B depicts the PMR head 100 after the PMR pole 130 has been formed. Thus, a seed layer 120 and the PMR pole 130 are shown. In a preferred embodiment, the PMR pole 130 is formed by providing a pattern (not shown) having an opening in which the PMR pole 130 has been plated. Note that layers 132, which include the excess pole material that has been plated when the PMR pole 130 was plated, are shown. However, these layers 132 are subsequently removed. The top 136, bottom 134, and sides 131 and 133 of the PMR pole 130 are also specifically indicated.

Figure 3C:
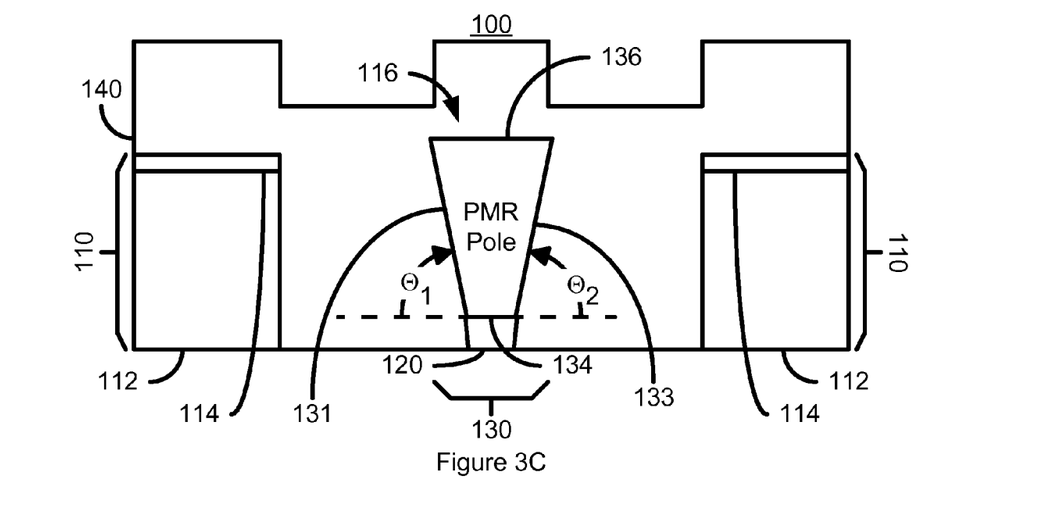

FIG. 3C depicts the PMR head 100 after the PMR pole 130 has been trimmed, portions of the seed layer 120 around the PMR pole 130 have been removed, and an insulator 140 has been deposited. The critical dimensions and the negative angle for the PMR pole 130 have been set by the pole trim. The negative angle of the PMR pole 130 can be seen in that the top 134 of the PMR pole 130 is wider than the bottom 136 of the PMR pole 130. Thus, the left side 131 of the PMR pole 130 is at an angle, $\Theta_1$, counterclockwise from a vertical dropped down from the upper left corner of the PMR pole 130. Similarly, the right side 133 of the PMR pole 230 is at an angle, $\Theta_2$, clockwise from a vertical dropped down from the upper right corner of the PMR pole 130. Thus, the PMR pole 130 has a negative angle. As can also be seen in FIG. 3C, the insulator 140 fills in the gaps between the PMR pole 130 and the CMP support structure 112 and the CMP barrier layer 114.

Note that the aperture 116 of the CMP uniformity structure 110 has a diameter that is selected based on several considerations. The aperture 116 is sufficiently wide such that the CMP uniformity structure 110 does not adversely affect any photolithography performed for the PMR pole. The width of the aperture 116 is also selected to allow for the pole trim that sets the critical dimensions of the PMR pole 130. The pole trim is preferably performed using argon ions aimed at an angle from normal to the surface of the PMR pole 130. Consequently, the aperture 116 is also wide enough such that the ions do not impact the CMP barrier layer 114 or the CMP support structure 112 in lieu of the PMR pole 130. On the other hand, the aperture 116 is narrow enough such that the CMP uniformity structure 110 allows the uniformity of the CMP step, discussed below, to be improved to be better than the thickness of the PMR pole 130. Thus, in a preferred embodiment, the width of the aperture 116 is on the order of ten times the width of the PMR pole 130. This is because the sides 118 of the aperture 116 are desired to be a distance away from the edges 131 and 133 of the PMR pole 130 that is approximately five times the width of the PMR pole 130. Consequently, in a preferred embodiment, the width of the aperture 116 is approximately one hundred microns.

Figure 3D:
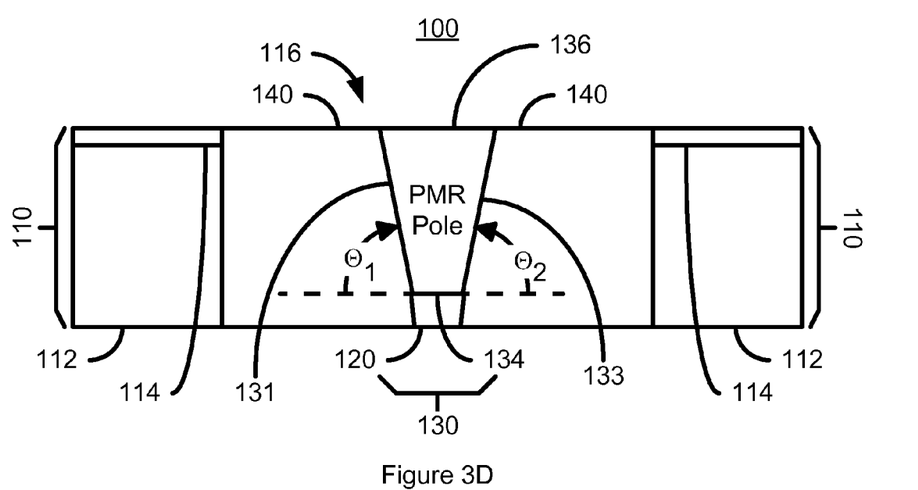

FIG. 3D depicts the PMR head 100 after completion of a CMP step that is engineered to remove the insulator 140. Thus, the excess insulator 140 has been removed, the PMR pole 130 exposed, and the exposed surface planarized. Because of the CMP uniformity structure 110, the variation in height of the top, exposed surface of the PMR head 100 is reduced. In addition, in the embodiment shown, the CMP barrier layer 114 has been removed. However, nothing prevents at least a portion of the CMP barrier layer 114 from remaining as part of the PMR head 100. In a preferred embodiment, the CMP barrier layer 114 is configured such that the CMP discussed above the insulator 140 at least five to ten times more rapidly than the CMP barrier layer 214. Thus, the removal rate of the insulator 140 is approximately five to ten times higher than the removal rate of the CMP barrier layer 114. In addition, because of the CMP uniformity structure 110, resulting surface has less variation in height than a conventional structure. The three sigma variation is less than the height of the PMR pole 130. In one embodiment, the three sigma variation is on the order of 0.1 µm. Once the CMP has been completed, any remaining CMP barrier layer 14 may be removed, preferably using a reactive ion etch.

Figure 3E:
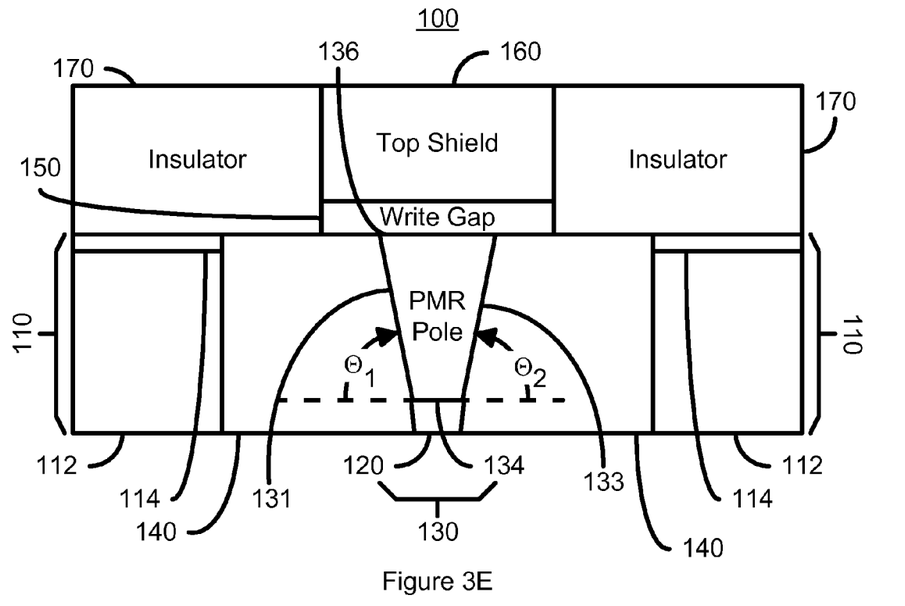

FIG. 3E depicts the PMR 100 after completion. Thus, the write gap 150, top shield 160, and insulator 170 are depicted.

Figure 4:
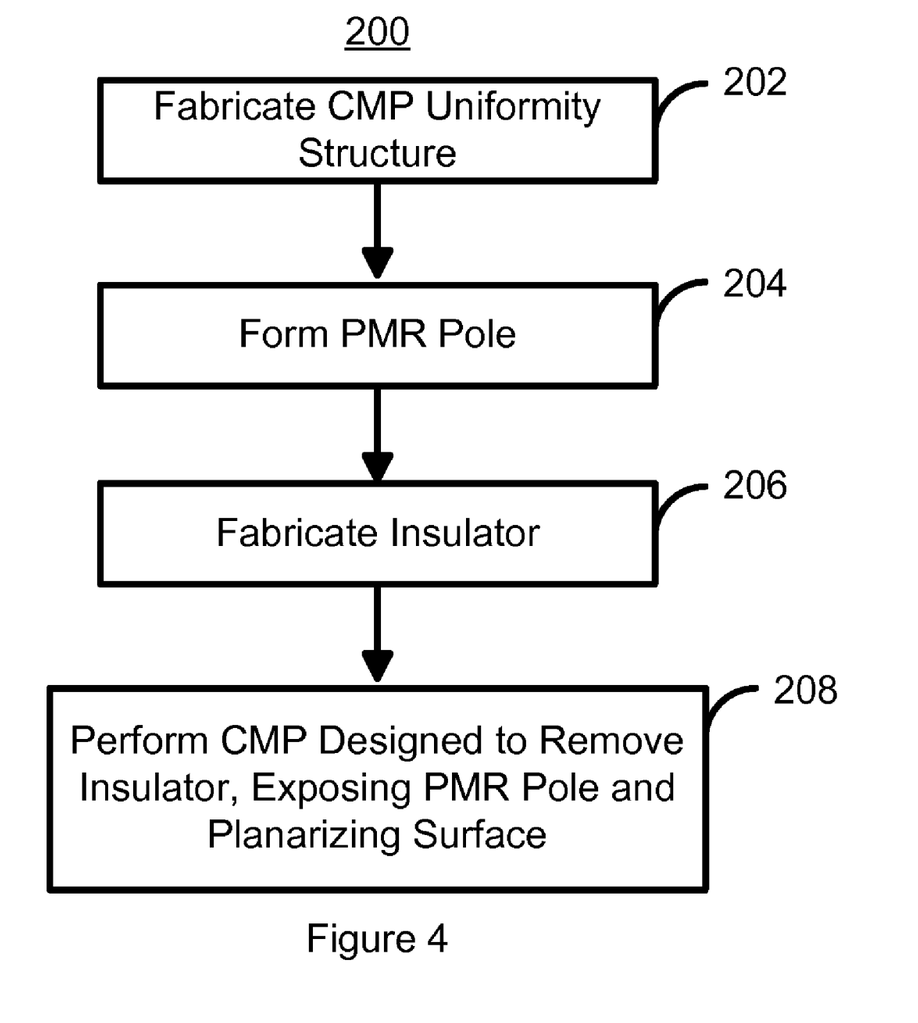
FIG. 4 is a high-level flow chart depicting one embodiment of a method in accordance with the present invention for fabricating a perpendicular magnetic recording pole in accordance with an exemplary embodiment of the present invention.

Thus, the PMR pole 130 may be more reliably fabricated and a more planar surface provided for subsequent steps in manufacturing the PMR head. Moreover, the CMP may be more easily and closely controlled by measuring the thickness of the insulator on top of the CMP barrier layer. Consequently, the PMR head 100 may be more reliably fabricated at higher dimensions FIG. 4 depicts a high-level flow chart of a method 200 for providing a PMR head in accordance with an exemplary embodiment of the present invention. The method 200 is described in the context of forming a single PMR head 200. However, one of ordinary skill in the art will readily recognize that typically multiple PMR heads 100 are fabricated simultaneously on a substrate. One of ordinary skill in the art will also readily recognize that other and/or additional steps not inconsistent with the present invention may be included in the method 200. Further, for clarity, the method 200 is described in the context of PMR heads 100. However, nothing prevents the use of the method 200 with another PMR head (not shown).

The CMP uniformity structure 110 is fabricated, via step 202. Step 102 preferably includes depositing the layer(s) of the CMP uniformity structure and patterning the CMP uniformity structure, generally using photolithography. A PMR pole 139 is formed, via step 204. Step 204 includes depositing a seed layer, performing photolithography to provide a pattern for the PMR pole, electroplating the PMR pole, removing excess seed layer, and trimming the pole. An insulating layer 140 is fabricated, preferably by sputtering $Al_2O_3$, via step 206. Thus, the PMR pole 130 is insulated. The insulator 140 preferably fills the aperture around the PMR pole 130. A CMP is then performed, via step 208. The CMP is configured to remove the insulator, thereby exposing the PMR pole and planarizing the surface. The CMP uniformity 110 structure provided in step 202 is configured to improve the uniformity of the CMP performed in step 208 and provide a more planar surface. In addition, the CMP barrier layer 114, if used, is significantly more resistant to removal by the CMP in step 108 than the insulator. Fabrication of the PMR head can then be completed.

Using the method 200, the PMR pole 130 may be provided. Because of the use of the CMP uniformity structure 110, the CMP performed in step 208 results in a more planar surface. In particular, a three sigma variation in height of the PMR head of below 0.1 µm may be achieved. Thus, the PMR pole may be more reliably fabricated and a more planar surface provided for subsequent steps in manufacturing the PMR head. Moreover, the CMP performed in the method 200 may be more easily and closely controlled by measuring the thickness of the insulator on top of the CMP barrier layer. Consequently, the method 100 can be used in fabricating a PMR head.

Figure 5:
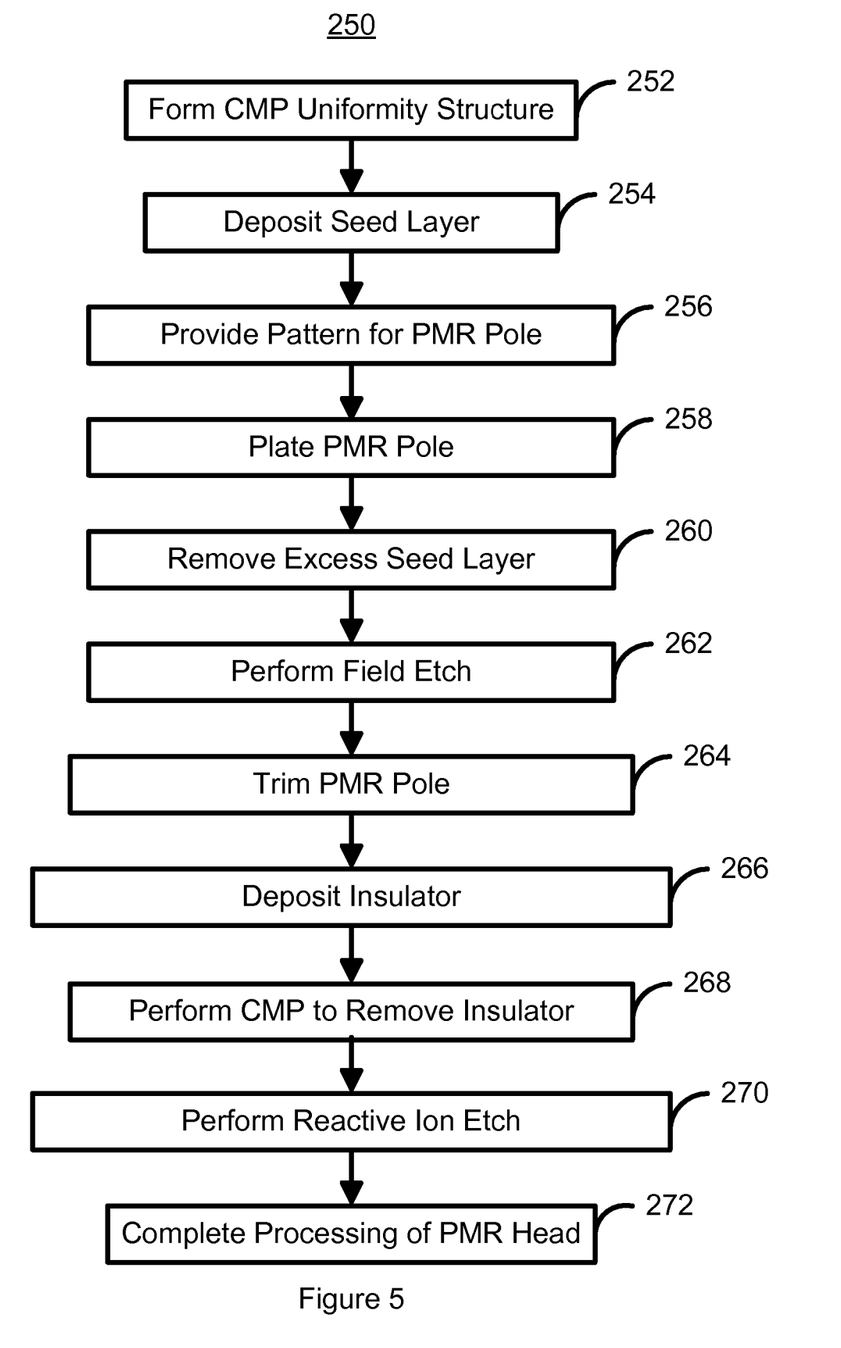
FIG. 5 is a flow chart depicting a method for providing a perpendicular magnetic recording pole in accordance with an exemplary embodiment of the present invention.

FIG. 5 depicts a more-detailed flow chart of a method 250 for providing a PMR head in accordance with an exemplary embodiment of the present invention. The method 250 is described in the context of the PMR head 100. Consequently, the method 250 is described in the context of the PMR head 100 depicted in FIGS. 3A-3E. Referring to FIGS. 3A-3E and FIG. 5, the method 150 is also described in the context of forming a single PMR head 100. However, one of ordinary skill in the art will readily recognize that typically multiple PMR heads 100 are fabricated simultaneously on a substrate. One of ordinary skill in the art will also readily recognize that other and/or additional steps not inconsistent with the present invention may be included in the method 250.

The method 250 commences with formation of the CMP uniformity structure 110, via step 252. Step 252 preferably includes depositing the layer(s) of the CMP uniformity structure 110 and patterning the CMP uniformity structure 110, generally using photolithography. In a preferred embodiment, step 202 include depositing the insulating layer(s) for the CMP support structure 112, depositing the layer(s) for the CMP barrier layer 114, and providing the aperture 116 and any other features in the CMP uniformity structure 110 using photolithography.

The PMR pole 130 is formed in steps 254-264 of the method 250. Thus, a seed 120 is provided, via step 254. A pattern for the PMR pole 130 is provided, via step 256. The pattern includes an opening (not shown) in which the PMR pole can be plated. The PMR pole 130 is then plated, via step 258.

The seed layer 120 is removed from the region around the PMR pole 130, via step 260. A field etch and pole trim are performed, via steps 262 and 264, respectively. The critical dimensions of the PMR pole 130 are set and the negative angle for the PMR pole 130 are provided by the pole trim performed in step 264.

An insulator is provided to insulate the PMR pole 130, via step 266. The insulator is preferably $Al_2O_3$ that is sputtered.

The CMP is performed to remove the excess portion of the insulator 140 and expose the PMR pole 130, via step 268. The CMP performed in step 168 is thus engineered to remove the insulator 140 and planarize the remaining exposed surface. In a preferred embodiment, therefore, the CMP performed in step 268 is designed to remove $Al_2O_3$. In a preferred embodiment, the CMP barrier layer 114 is configured such that the CMP performed in step 268 removes the insulator 140 at least five to ten times more rapidly than the CMP barrier layer 114. Thus, the removal rate of the insulator 140 in the CMP step 268 is approximately five to ten times higher than the removal rate of the CMP barrier layer 114 during the CMP step 268.

Fabrication of the PMR head 100 is completed, via step 272. Step 272 thus preferably includes formation of a write gap, fabrication of a top shield including photolithography and deposition of a seed layer, providing another insulating layer that is preferably $Al_2O_3$, and performing a subsequent CMP.

Thus, the method 250 can be used to provide a PMR head. Because of the use of the CMP uniformity structure, the CMP performed in step 268 results in a more planar surface. In particular, a three sigma variation in height of the PMR head 100 of below 0.1 µm may be achieved. Thus, the PMR pole 130 may be more reliably fabricated and a more planar surface provided for subsequent steps in manufacturing the PMR head. Moreover, the CMP performed in the method 250 may be more easily and closely controlled by measuring the thickness of the insulator on top of the CMP barrier layer. Consequently, the method 250 provides a more reliable method for fabricating a PMR head.

We claim:

1. A perpendicular magnetic recording head comprising;
   a chemical mechanical planarization (CMP) uniformity structure having an aperture therein, the CMP uniformity structure including a CMP support structure and a CMP barrier layer on the CMP support structure, the aperture extending through the CMP support structure and the CMP barrier layer, the aperture having an aperture width;
   a perpendicular magnetic recording pole within the aperture, the pole having a pole width, the aperture width being at least ten multiplied by the pole width; and
   an insulator in a remaining portion of the aperture.

2. The perpendicular magnetic recording head of claim 1 wherein the CMP support structure is insulating.

3. The perpendicular magnetic recording head of claim 2 wherein the CMP support structure has a thickness equal to at least 0.1 µm and no more than 0.4 µm.

4. The perpendicular magnetic recording head of claim 2 wherein a side of the perpendicular magnetic recording pole has a negative angle with respect to a vertical direction such that a top of the perpendicular magnetic recording pole is wider than a bottom of the perpendicular magnetic recording pole.

5. The perpendicular magnetic recording head of claim 1 further comprising:
   a seed layer under the perpendicular magnetic recording pole.

6. The perpendicular magnetic recording head of claim 1 further comprising:
   a write gap on the perpendicular magnetic recording pole; and
   a shield on the write gap.

7. The perpendicular magnetic recording head of claim 1 wherein the CMP support structure has a thickness equal to at least a desired thickness of the perpendicular magnetic recording pole.

8. The perpendicular magnetic recording head of claim 1 wherein a side of the perpendicular magnetic recording pole has a negative angle with respect to a vertical direction such that a top of the perpendicular magnetic recording pole is wider than a bottom of the perpendicular magnetic recording pole and wherein the aperture has sidewalls substantially aligned with the vertical direction.

9. A perpendicular magnetic recording head comprising;
   a chemical mechanical planarization (CMP) uniformity structure having an aperture therein, the CMP uniformity including an insulating CMP support structure and a CMP barrier layer on the CMP support structure, the aperture extending through the CMP support structure and the CMP barrier layer, the CMP support structure having a thickness equal to at least a desired thickness of the perpendicular magnetic recording pole, the aperture having an aperture width;
   a plated perpendicular magnetic recording pole within the aperture, the plated perpendicular magnetic recording pole having a pole width, the aperture width being at least ten multiplied by the pole width;
   an insulator in a remaining portion of the aperture;
   a write gap on the plated perpendicular magnetic recording pole; and
   a shield on the write gap.

* * * * *